United States Patent
Goto et al.

(10) Patent No.: US 6,779,624 B2
(45) Date of Patent: Aug. 24, 2004

(54) CONTROL UNIT FOR POWER STEERING APPARATUS AND STEERING-WHEEL-ANGLE CORRECTING SYSTEM

(75) Inventors: Atsutoshi Goto, Fucho (JP); Hiroshi Sakamoto, Kawagoe (JP); Yasuhiro Yuasa, Fucho (JP); Shuichi Tanaka, Tokyo (JP); Shigeru Muraoka, Amagasaki (JP); Masakuni Tanaka, Kameoka (JP)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/434,638

(22) Filed: May 12, 2003

(65) Prior Publication Data

US 2004/0003955 A1 Jan. 8, 2004

(30) Foreign Application Priority Data

May 16, 2002 (JP) ........................................ 2002-141776

(51) Int. Cl.[7] .............................................. B62D 5/06
(52) U.S. Cl. ........................ 180/403; 180/422; 180/439
(58) Field of Search ................................ 180/406, 417, 180/422, 421, 426, 439, 441, 403; 701/41, 44

(56) References Cited

U.S. PATENT DOCUMENTS

| | | | | |
|---|---|---|---|---|
| 5,020,618 A | | 6/1991 | Nagao ......................... 180/132 |
| 6,095,277 A | * | 8/2000 | Bohner et al. ............... 180/403 |
| 6,102,150 A | * | 8/2000 | Bohner et al. ............... 180/403 |
| 6,435,522 B1 | * | 8/2002 | Van Den Brink et al. ......................... 280/5.509 |
| 6,554,094 B1 | * | 4/2003 | Bell et al. ..................... 180/402 |
| 6,612,393 B2 | * | 9/2003 | Bohner et al. ............... 180/405 |
| 2002/0117347 A1 | * | 8/2002 | Nishizaki et al. ............ 180/403 |

* cited by examiner

Primary Examiner—Avraham Lerner
(74) Attorney, Agent, or Firm—L. J. Kasper

(57) ABSTRACT

In a control unit for use with a power steering apparatus, there are provided and integrated into a single body, a main operating fluid feed device for supplying the hydraulic cylinder with an amount of oil corresponding to the amount of rotation of the steering wheel H, an auxiliary operating fluid feed device for supplying a correcting oil for adjusting drive of said hydraulic cylinder according to control signal, and a steering wheel angle sensor disposed around the rotating shaft of the steering wheel connected to said main operating fluid feed device, to detect steering wheel angle corresponding to the rotating position of said steering wheel.

6 Claims, 10 Drawing Sheets

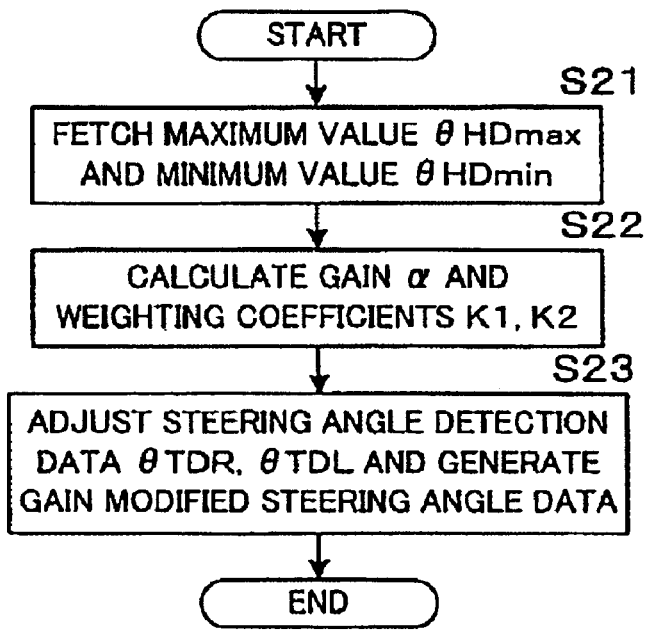
F I G. 9
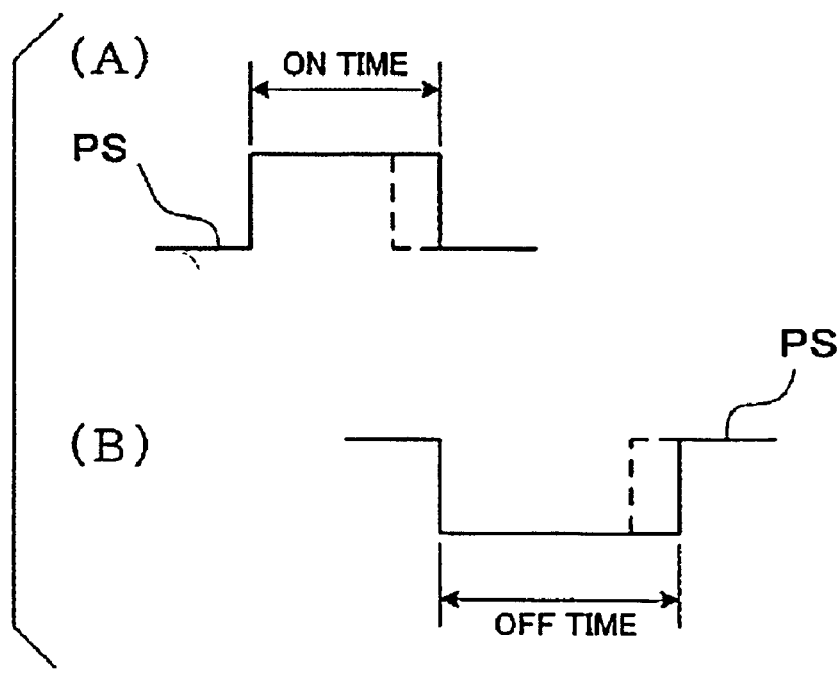
F I G. 11

CONTROL UNIT FOR POWER STEERING APPARATUS AND STEERING-WHEEL-ANGLE CORRECTING SYSTEM

BACKGROUND OF THE DISCLOSURE

The present invention relates to a control unit for a power steering apparatus of a hydraulic cylinder (steering cylinder) suitable for driving and controlling the steered wheels at a prescribed steering angle (hereinafter referred to as the tire angle, for the sake of convenience) in response to a rotational position of the steering wheel. The present invention also relates to a steering-wheel-angle correcting system for correcting deviation in the relation of correspondence between the steering wheel angle and the tire angle of the steered wheels corresponding to the rotational position of the steering wheel, more specifically a steering wheel angle correcting system suitable for vehicles with different steering wheel rotational ranges or steering ranges of steered wheels.

On industrial vehicles such as fork lift trucks, etc., there is provided a power steering apparatus to enable smooth steering wheel operation. As the power steering apparatus, a full-hydraulic power steering apparatus is known which is realized in a way to steer the steered wheels by feeding oil, in an amount corresponding to the amount of rotational operation of the steering wheel, to the steering cylinder by means of a hydraulic operating fluid feed unit.

In the above-described type of power steering apparatus, the amount of oil fed to the steering cylinder by the hydraulic fluid feed unit varies, in some cases, because of the rotating speed of the steering wheel. For example, in the case where the rotating speed of the steering wheel is comparatively slow, the amount of oil fed to the steering cylinder is liable to be reduced. In that case, a problem appears that a deviation is produced in the relation of correspondence between the steering wheel angle corresponding to the actual amount of rotational operation and the tire angle of the steered wheels. Moreover, there are cases where the oil to be fed to the steering cylinder by the hydraulic fluid feed unit, etc. leaks, and the same problem as above also appears in such a case.

For that reason, a general practice followed on power steering apparatus is to correct deviation in the relation of correspondence between the steering wheel angle corresponding to the amount of rotational operation and the tire angle of the steered wheels. This kind of power steering apparatus is now known, conventionally, and examples are provided in the Japanese Laid-open Patent Publication No. 10-181626 and the Japanese Laid-open Patent Publication No. 10-287258, etc. For example, in the apparatus indicated in the Japanese Laid-open Patent Publication No. 10-181626, the steering wheel angle corresponding to the amount of rotational operation is detected with a steering wheel angle sensor, and the steering angle of the steered wheels (tire angle) at that time is detected with a steering angle sensor. On the part of the controller, it determines the target steering wheel angle, which is the normal steering wheel angle, with a steering wheel angle adjusting map based on the steering angle of the steered wheels and, in case the deviation between the target steering wheel angle and the (actual) steering wheel angle exceeds the range of tolerance, the controller opens an electromagnetic switching valve. This makes it possible to circulate part of the oil volume to be fed from the steering control unit ("SCU"), which may be of the type sold commercially for many years by one of the assignees of the present invention under the trademark "Orbitrol" (a registered trademark of Eaton Corporation). The SCU comprises a hydraulic operating fluid feed unit, which feeds fluid to the steering cylinder, and reduces the proportion of fluctuation of the steering cylinder against the amount of rotating operation of the steering wheel, thus enabling idling of the steering wheel. Namely, an adjustment of steering wheel is achieved until the amount of deviation is kept in the range of tolerance with idling of the steering wheel.

On the conventional power steering apparatus, the steering angle sensor, SCU, electromagnetic switching valve, etc. are constructed as independent units. For that reason, it has been rather complicated and troublesome to handle those units which must be treated separately from one another. Moreover, on the above-described apparatus, in which a steering wheel angle adjusting map was prepared, based on the range of rotation of the steering wheel and the steering range of the steered wheels on the applicable vehicle, and was memorized in advance in the controller, there was a problem that the apparatus was applicable only to a single type of vehicle having the particular range of rotation of the steering wheel and the particular steering range of the steered wheels in common.

BRIEF SUMMARY OF THE INVENTION

It is therefore an object of the present invention to provide a control unit for use with a power steering apparatus with improved operability. It is another object of the present invention to provide a steering wheel angle correcting system applicable to vehicles with different steering wheel rotational ranges or steering ranges of steered wheels.

In order to accomplish the above-mentioned objects, the present invention provides a control unit for use with a power steering apparatus including a hydraulic cylinder for controlling steerage of steered wheels in response to rotation of a steering wheel and a tire angle sensor for detecting the tire angle of the steered wheels, the control unit comprising: a main operating-oil supply device (the SCU), removably connected to a rotation shaft of the steering wheel, for supplying the hydraulic cylinder with an amount of oil corresponding to a rotated amount of the steering wheel; a correcting-oil supply device for, in response to a control signal, supplying correcting oil to correct operation of the hydraulic cylinder; a steering-wheel-angle detector, disposed around the rotation shaft of the steering wheel connected with the main operating-oil supply device, for detecting a steering wheel angle corresponding to a rotational position of the steering wheel; and a control circuit device for generating, on the basis of the steering wheel angle detected by said steering-wheel-angle detector and the tire angle detected by the tire angle sensor, a control signal to compensate for a discrepancy in the corresponding relationship between the steering wheel angle and the tire angles, and controlling the supply, by said correcting-oil supply device, of the correcting oil, wherein the steering-wheel-angle detector and the control circuit device are attached to a housing of the main operating-oil supply device so that the steering-wheel-angle detector and the control circuit device are provided as a one-piece unit with the main operating-oil supply device.

According to the present invention, it becomes possible to promote improvement of operability of the control unit, because the steering-wheel-angle detector and the control circuit device can be handled as a one-piece unit, together with the main operating-oil supply device, as the main component element.

In order to accomplish the other object above-mentioned, the present invention provides a steering-wheel-angle correcting system for use with a power steering apparatus including a hydraulic device for controlling steerage of steered wheels in response to rotation of a steering wheel, the steering-wheel-angle correcting system comprising: a first section that learns an entire steered range of the steered wheels on the basis of a tire angle detection signal indicative of a tire angle of the steered wheels; a second section that learns a rotational range of the steering wheel corresponding to the entire steered range of the steered wheels, on the basis of a steering-wheel-angle detection signal corresponding to a rotational position of the steered wheel; a third section that determines, on the basis of the learned entire steered range of the steered wheels and the learned rotational range of the steering wheel corresponding to the entire steered range of the steered wheels, first modifying data concerning a rightward steering direction of the steered wheels and second modifying data concerning a leftward steering direction of the steered wheels; and a fourth section that modifies at least one of a current tire angle detection signal and current steering-wheel-angle detection signal in accordance with the first or second modifying data corresponding to a current steering direction of the steered wheels, so as to correct the steerage of the steered wheels in accordance with a deviation between the tire angle detection signal and the steering-wheel-angle detection signal.

According to the steering-wheel-angle correcting system of the present invention, the system is realized in a way to learn the entire steered range of the steered wheels and the rotational range of the steering wheel corresponding to it, modify at least one of the current tire angle detection signal or the current steering wheel angle detection signal with either the first or the second modifying data corresponding to the current steering direction of the steered wheels, and modify steerage of the steered wheels, depending on the deviation between the tire angle detection signal and the steering wheel angle detection signal. It then becomes possible to apply the power steering apparatus having this system to vehicles with different steering wheel rotating ranges or steering ranges of steered wheels, and correct deviation in the relation of correspondence between the steering wheel angle and the tire angle of the steered wheels corresponding to the rotational position of the steering wheel.

BRIEF DESCRIPTION OF THE DRAWINGS

FIG. 9 is a flow chart showing an example of processing for gain adjustment executed by the tire angle detection range learning section;

FIG. 11 is a diagram showing an example of adjustment of ON-OFF time of drive pulse signals.

DETAILED DESCRIPTION OF THE PREFERRED EMBODIMENT

An embodiment of the present invention will be explained in detail, with reference to the attached drawings.

Figure 1:
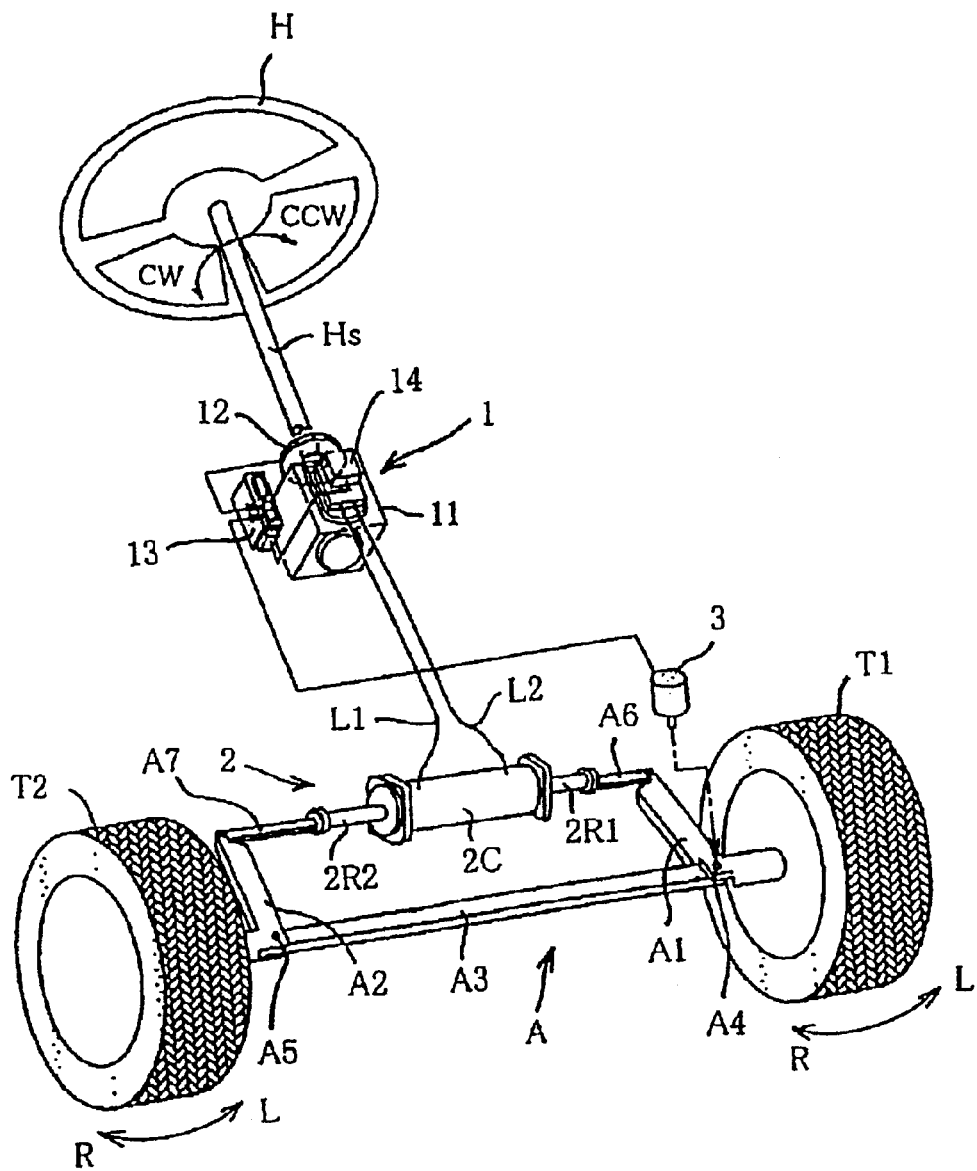
FIG. 1 is a schematic view showing an example of a power steering apparatus provided with the control unit according to the present invention.

In this embodiment, explanation will be given for a situation wherein the control unit and the steering wheel angle correcting system according to the present invention are applied to vehicles which are different in steering wheel rotating range or steering range of steered wheels depending on vehicle types, like industrial vehicles such as fork lift, etc., for example. FIG. 1 shows an example of approximate or typical construction of a hydraulic power steering apparatus provided with a control unit according to the present invention.

In FIG. 1, the power steering apparatus comprises a control unit 1 connected to the steering wheel shaft Hs of the steering wheel H, a steering cylinder 2 for driving the left and right steered wheels T1, T2 through a steering device A. The apparatus also includes a tire angle sensor 3 for detecting the tire angle of an optional steered wheel (steered wheel T1 on the left side as seen from the steering wheel H side in the illustrated example), etc. The control unit 1 is provided with a steering control unit (an "SCU") 11 which is the main hydraulic operating fluid feed device, and this SCU 11 is connected, through hydraulic lines L1, L2, to the hydraulic cylinder 2 provided on the steering device A.

In the steering device A, the left steering shaft arm A1 is rotatably connected, through a king pin A4, to the left end of the axle shaft A3, while the right steering shaft arm A2 is rotatably connected, through a king pin A5, to the right end of the axle shaft A3. At one end of the left steering shaft arm A1 is attached the left steered wheel T1, and to the other end is connected, through a connecting member A6, one piston rod 2R1 of the hydraulic cylinder 2. At one end of the right steering shaft arm A2 is attached the right steered wheel T2, and to the other end is connected, through a connecting member A7, the other piston rod 2R2 of the hydraulic cylinder 2. In the steering device A, as the respective rods 2R1, 2R2 of the hydraulic cylinder 2 move to the leftward direction L as seen from the steering wheel H side, the left steering shaft arm A1 and the right steering shaft arm A2 turn in that same direction L against the axle shaft A3 together with the pins A4, A5 respectively, to thereby steer the left steered wheel T1 and the right steered wheel T2 in the leftward direction L. Moreover, as the respective rods 2R1, 2R2 of the hydraulic cylinder 2 move to the rightward direction R as seen from the steering wheel H side, the left steering shaft arm A1 and the right steering shaft arm A2 turn in that same direction R against the axle shaft A3 together with the pins A4, A5 respectively, to thereby steer the left steered wheel T1 and the right steered wheel T2 in the rightward direction R.

The tire angle sensor 3, comprising a potentiometer, is attached to the king pin A4 on the left steering shaft arm A1 side. This tire angle sensor 3 detects the amount of rotation of the king pin A4, and outputs an analogous (voltage value, etc.) tire angle detection signal θT, corresponding to that amount of rotation, to the position data conversion section 13B indicated in FIG. 6.

Figure 2A:
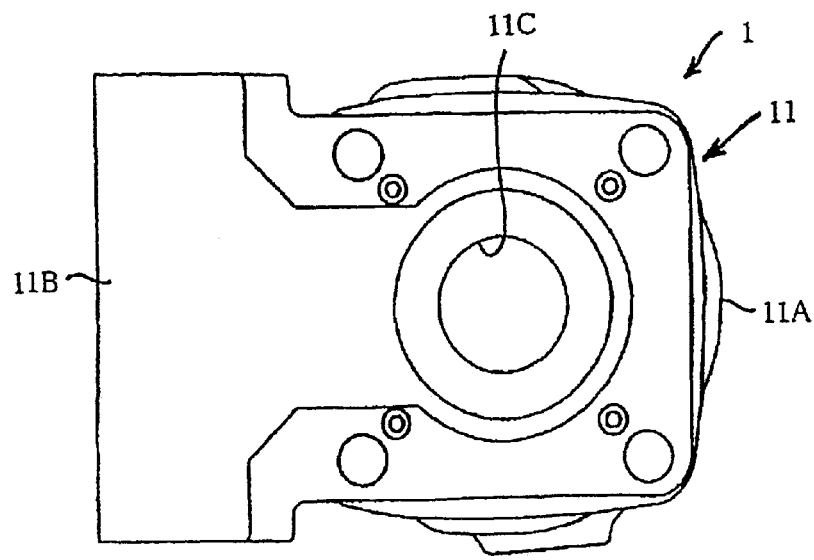
FIG. 2A is a plan view of the control unit as seen from the steering wheel shown in FIG. 1.
Figure 2B:
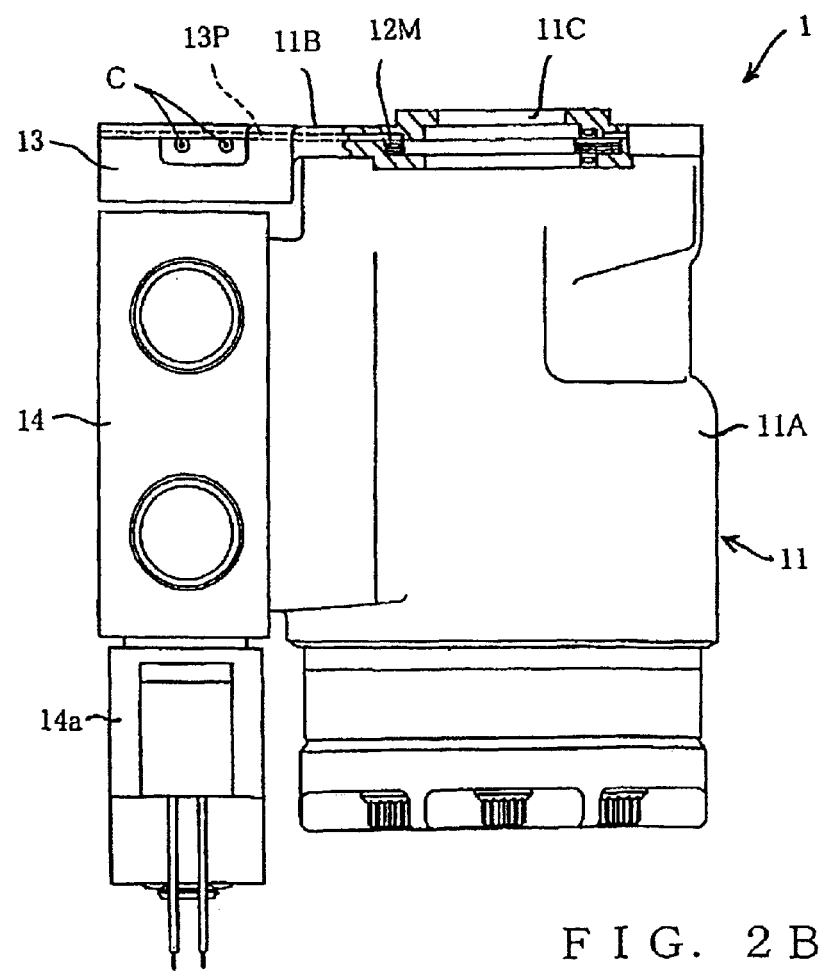
FIG. 2B is a front view of the control unit shown in FIG. 2A with certain parts cut away.

FIGS. 2A and 2B show an example of appearance shape of the control unit 1, FIG. 2A being a plan view of the control unit 1, as seen from the steering wheel H side shown in FIG. 1, and FIG. 2B being a partially cut-away plan view of the control unit 1 as shown in FIG. 2A.

In FIGS. 2A and 2B, the control unit 1 comprises the SCU 11, a steering wheel angle detector 12M of the steering wheel angle sensor 12, the controller 13, and a solenoid valve 14 which is an auxiliary oil feed device, etc. To the housing 11A of the SCU 11 are attached the steering wheel angle detector 12M and the controller 13 at the top face on the steering wheel H side, in an integrated state through a protective member 11B, as may be required. The protective member 11B is provided with a steering wheel shaft insertion hole 11C for inserting and mounting the steering wheel shaft Hs, and around this insertion hole 11C is disposed the steering wheel angle detector 12M, and close to this steering wheel angle detector 12M is disposed the controller 13. The steering wheel angle detector 12M is provided with a ring shaped stator 12S and coils 12A to 12D, as is shown in FIG. 5. The controller 13 is provided with a circuit board 13P, comprising certain elements not illustrated herein, such as an MPU, ROM, RAM, etc.

The circuit board 13P extends from above a solenoid valve 14, attached to the side face of the housing 11A, to a point corresponding to the disposition of the steering wheel angle detector 12M, and on this circuit board 13P is disposed the steering wheel angle detector 12M. To the controller 13 are electrically connected the solenoid valve 14 and the tire angle sensor 3, as indicated in FIG. 1, through signal wire C. In the drawing, the signal wire C is a signal wire for the solenoid valve 14, while illustration of the signal wire for the tire angle sensor 3 is omitted.

As described above, the control unit 1, which is constructed as a single unit, in which the steering wheel angle detector 12M, the controller 13, the solenoid valve 14, etc. are integrated in the housing 11A of the SCU 11, is easy to handle. Moreover, since the steering wheel angle detector 12M is disposed around the insertion hole 11C of the SCU 11 and the circuit board 13P is disposed close to this steering wheel angle detector 12M, it becomes possible to integrate this detector 12M and the circuit board 13P with each other by means of an optional protective member 11B or a mounting member, etc., thus facilitating the mounting of the detector 12M and the circuit board 13P on the housing 11A.

The control unit 1, constructed in the manner described above, is detachably connected to the steering wheel shaft Hs. Namely, as the tip of the steering wheel shaft Hs is inserted in the steering wheel insertion hole 11C of the SCU 11, the steering wheel shaft Hs is inserted, through an optional mechanism, into a fluid measuring mechanism (in the subject embodiment, a gerotor gear set) 11C, as shown in FIG. 3, provided in the SCU 11.

Figure 3:
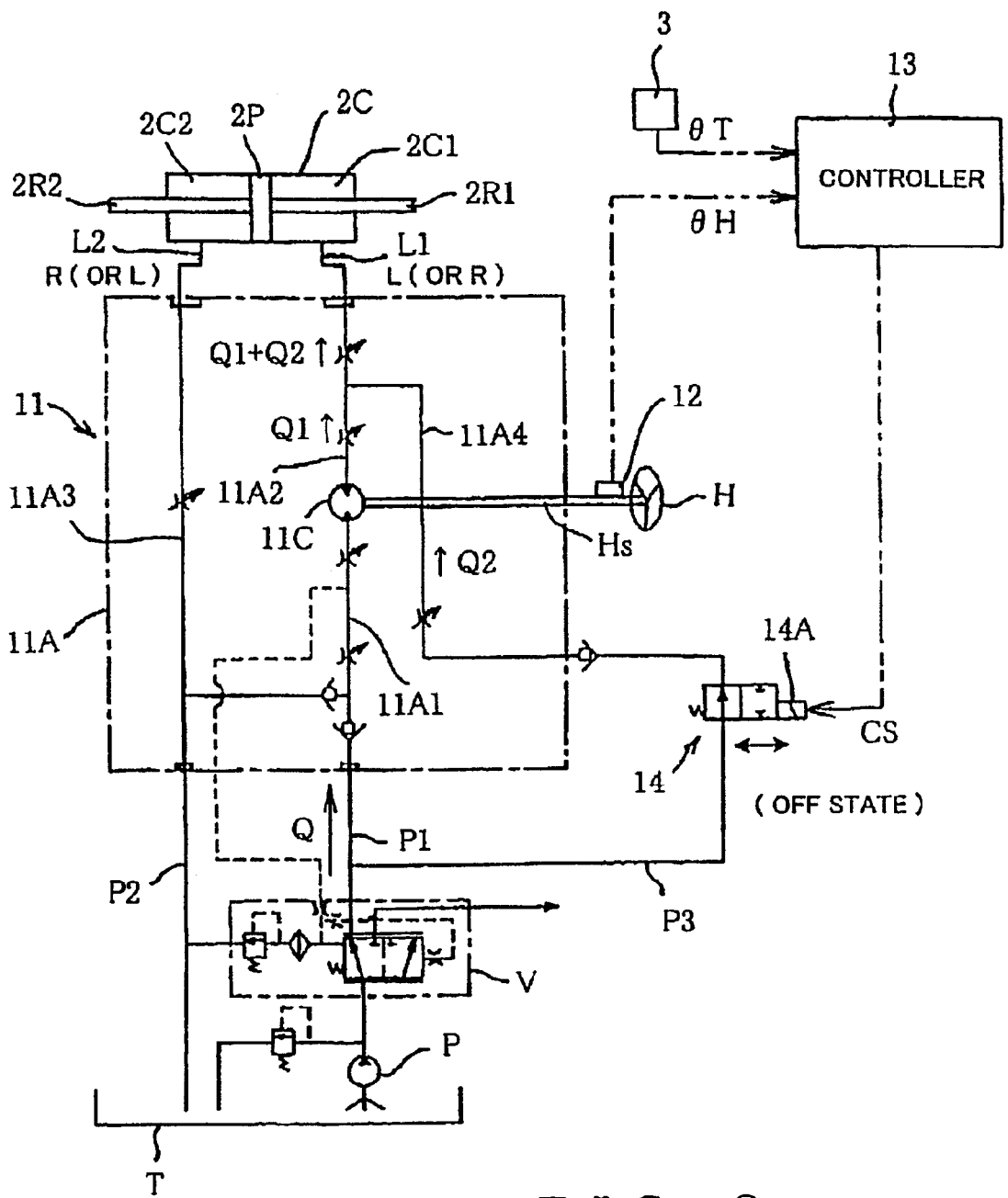
FIG. 3 is a hydraulic circuit diagram showing an example of the control unit and a hydraulic circuit associated therewith, which particularly shows conditions when no compensation is made for a deviation of the steering wheel angle.

FIG. 3 shows an example of control unit 1 and a hydraulic circuit therefor. In FIG. 3, the SCU 11 feeds hydraulic operating fluid Q, supplied from a hydraulic pump P, through a pressure and flow rate compensation valve V and a feed line P1, to the fluid measuring mechanism 11C, through an inflow channel 11A1. The measuring mechanism 11C feeds, as the steering wheel H is turned to the leftward direction of rotation CCW indicated in FIG. 1, an amount of oil Q1 corresponding to that amount of that particular rotational operation, to the oil chamber 2C1 on one side of the cylinder 2, through the first feed and discharge channel 11A2 and the hydraulic line L1. As a result, the piston 2P moves in the leftward direction L, together with the rods 2R1, 2R2, and the shaft arms A2, A3, as indicated in FIG. 1 turn in the same direction together with the king pins A4, A5, to steer the steered wheels T1, T2 to a tire angle corresponding to the rotational position of the steering wheel H. Furthermore, as the steering wheel H is turned in the rightward direction of rotation CW indicated in FIG. 1, (the piston 2P) feeds an amount of oil Q1 corresponding to the amount of that particular rotational operation, to the oil chamber 2C2 on the other side of the cylinder 2, through a non-illustrated oil feed direction selecting valve, the second feed and discharge channel 11A3 and the hydraulic line L2. As a result, the piston 2P moves in the rightward direction R together with the rods 2R1, 2R2, and the shaft arms A2, A3 turn in the same direction together with the king pins A4, A5, to steer the steered wheels T1, T2 to a tire angle corresponding to the position of rotation of the steering wheel H. The oil discharged from the hydraulic cylinder 2 through the SCU 11 is discharged into an oil tank or reservoir T through the exhaust line P2.

Figure 4:
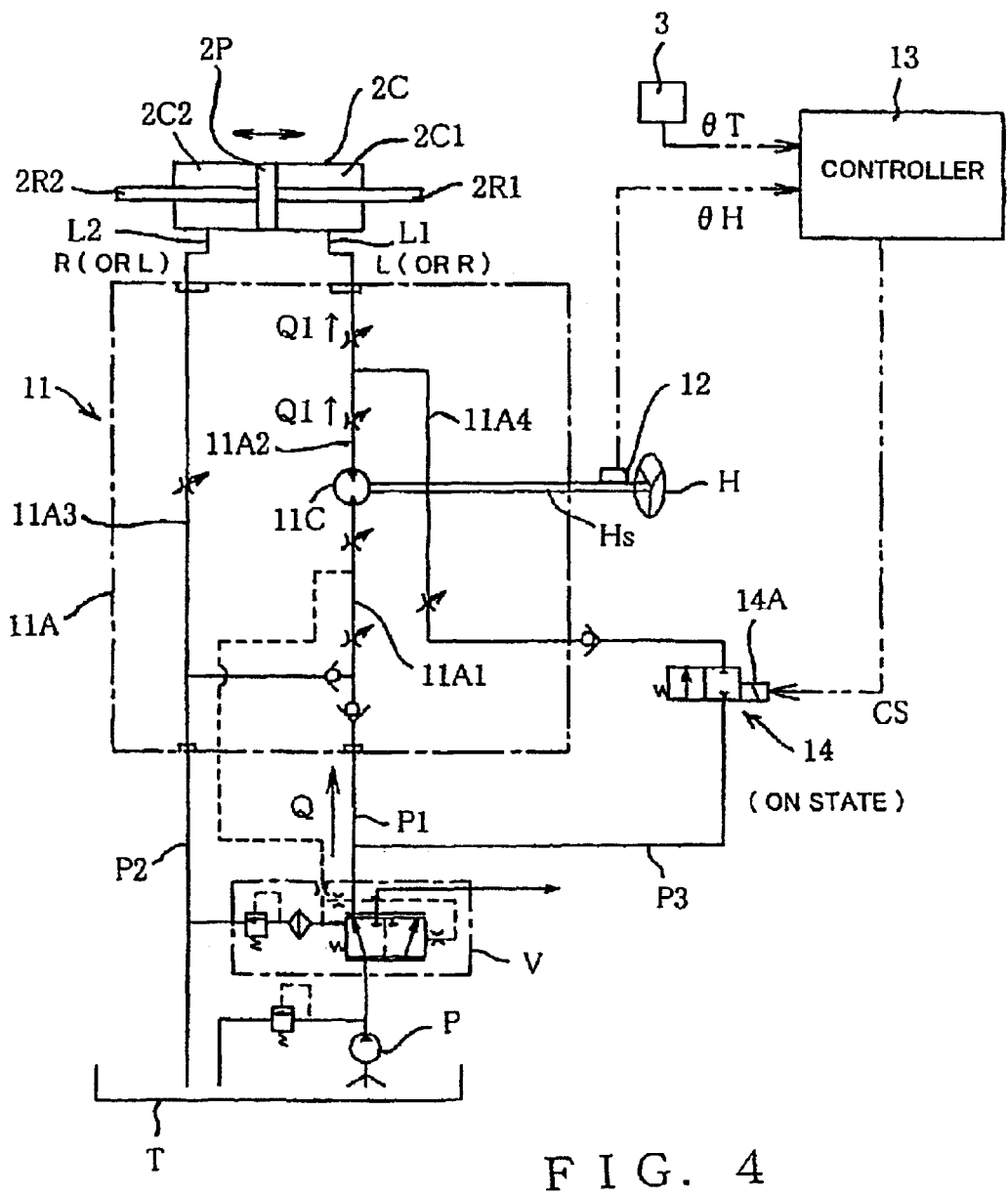
FIG. 4 is a diagram showing conditions when compensation is made for a deviation of the steering wheel angle in the hydraulic circuit of FIG. 3.

To the first feed and discharge channel 11A2 is connected a bypass channel 11A4, which is disposed to bypass the fluid measuring mechanism 11C. To the bypass channel 11A4 is connected an auxiliary feed line P3 communicating with the feed line P1, and in this auxiliary feed line P3 is provided a solenoid valve 14 of the normally-open type. The solenoid valve 14, which is a 2-position, 2-way switching valve, is placed at the open position (position indicated in FIG. 3) feeding correcting oil Q2 from the feel line P1 to the bypass channel 11A4 through the auxiliary feed line P3, in normal steering, i.e. a state in which no deviation is produced in the steering wheel angle. Therefore, the flows Q1+Q2 are supplied to the hydraulic cylinder 2 as the total amount of oil. In the state in which a deviation is produced in the steering wheel angle, the piston 2P of the hydraulic cylinder 2 gets in a state of going beyond the normal position in relative position with the steering wheel, for example, and the solenoid valve 14 is placed at the closed position (position indicated in FIG. 4) closing the auxiliary feed line P3, to stop the supply of correcting oil Q2 to the bypass channel 11A4. Therefore, Q1 is supplied to the hydraulic cylinder 2 as the total amount of oil. The transition between closed position and open position is made with ON-OFF control of the solenoid 14A of the solenoid valve 14.

The steering wheel angle sensor 12 comprises an electromagnetically induced rotary position detecting sensor. The steering wheel angle sensor 12 in this embodiment may be implemented such as by using a technique of rotary position detecting device as disclosed in the Japanese Laid-open Patent Publication No. 11-359431, for example. Therefore, its approximate construction can be only briefly referenced hereinafter.

Figure 5A:
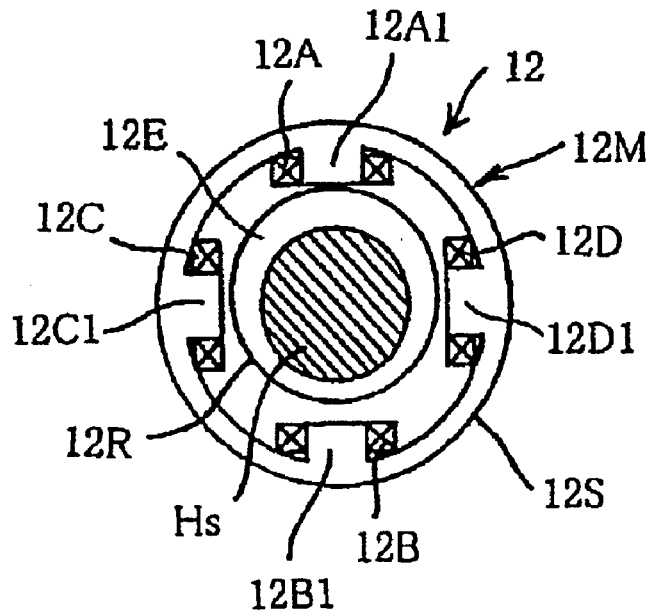
FIG. 5A is a diametric sectional view of an example of the steering angle sensor mounted on a steering shaft.
Figure 5B:
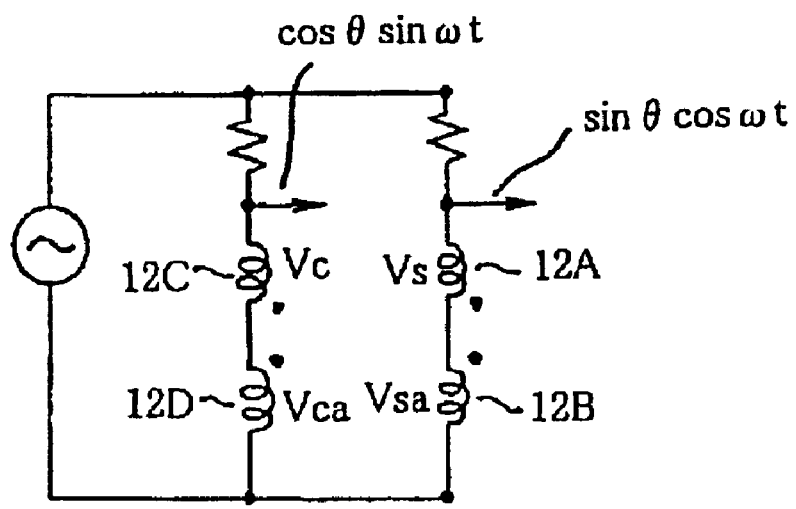
FIG. 5B is a block diagram showing an example of electric and electronic circuits associated with detecting coils of the steering wheel angle sensor as shown in FIG. 5A.

FIGS. 5A and 5B show an example of a steering wheel angle sensor 12 constructed with an electromagnetically induced rotary position detecting sensor, capable of detecting, in absolute value, the steering wheel angle of 0 degree to 360 degrees of rotation of the steering wheel H, for example. FIG. 5A is a sectional view of the steering wheel angle detector 12M attached to the steering wheel shaft Hs, while FIG. 5B is a block diagram showing an example of electric and electronic circuit relating to the detecting coils 12A to 12D of the steering wheel angle detector 12M. The steering wheel angle detector 12M comprises a stator 12S and a rotor 12R. The rotor 12R comprises a magnetic response member 12E of a predetermined shape, e.g., in the shape of an eccentric ring that is attached to the steering wheel shaft Hs, which is the subject of detection. The magnetic response member 12E may be made of any suitable material capable of causing magnetic coupling factors of the detecting coils 12A–12D to change, an may comprise a magnetic substance like iron or the like, an electrically conductive substance like copper or the like, or a combination of a magnetic substance and an electrically conductive substance. The stator 12S is disposed in a way to "face" the rotor 12R in the radial direction, i.e., with a radial gap therebetween.

The stator 12S is formed in the shape of a completely round ring. On the inner circumferential face of the stator 12S are disposed four coils 12A to 12D, as detecting coils, in the circumferential direction at predetermined intervals, e.g., at intervals of 90°. Namely, the stator 12S is provided with a first iron core (magnetic core) 12A1 having wound thereon a coil 12A for a sine output, a second iron core 12B1 having wound thereon a coil 12B at a position 180° on the opposite side from the coil 12A, a third iron core 12C1 having wound thereon a coil 12C for a cosine output, and a fourth iron core 12D1 having wound thereon a coil 12D at a position 180° on the opposite side from the coil 12C. The magnetic flux produced by each of the coils 12A to 12D, and passing through each of the iron cores 12A1 to 12D1, is directed in the radial direction, relative to the steering wheel shaft Hs. A gap is formed between an end face of each of the iron cores 12A1 to 12D1 and the magnetic response member 12E of the rotor 12R, and the rotor 12R turns without engaging in contact with the stator 12S. The gap between the magnetic response member 12E and each of the iron cores 12A1 to 12D1 varies depending on the rotating position, because of the predetermined shape, e.g., the eccentric ring shape, of the magnetic response member 12E in the rotor 12R. Because of such variation in the gap between opposed faces, the amount of magnetic flux passing through each of the coils 12A to 12D changes through the iron cores 12A1 to 12D1, to thereby change the impedance of the coils 12A to 12D.

With this construction, the impedance of the respective coils in the paired coils 12A, 12B and 12C, 12D opposed at 180° differentially varies. Namely, supposing that, in the pair of coils 12A and 12B in the sine phase, an impedance variation, i.e., a variation in an output amplitude of the coil 12A, shows functional characteristics of "Po+Psin θ" in relation to the rotational angle of the steering wheel shaft Hs, an impedance variation, i.e., a variation in an output amplitude of the other coil 12B shows functional characteristics of "Po–P sin θ" in relation to the rotational angle θ of the steering wheel shaft Hs. In the same way, supposing that, in the pair of coils 12C and 12D in the cosine phase, an impedance variation, i.e., a variation in an output amplitude of the coil 12C shows functional characteristics of "Po+P cos θ" in relation to the rotational angle θ of the steering wheel shaft Hs, an impedance variation, i.e., a variation in an output amplitude of the other coil 12B shows functional characteristics of "Po–P cos θ" in relation to the rotational angle θ of the steering wheel shaft Hs.

As shown in FIG. 5B, the respective coils 12A to 12D are excited at constant voltage or constant current intensity by a predetermined single-phase high-frequency A.C. signal (represented provisionally by sin ωt) generated by a prescribed A.C. generating source 12P. The between-terminal voltages Vs, Vsa, Vc, Vca of the respective coils 12A to 12D present respective levels according to the respective impedances corresponding to the rotational angle θ, as follows:

Vs=(Po+P sin θ)sin ωt

Vsa=(Po–P sin θ)sin ωt

Vc=(Po+P cos θ)sin ωt

Vca=(Po–P cos θ)sin ωt

For each of the coil pairs, two coils (12A and 12B, 12C and 12D) are differentially connected in opposite phases respectively, to generate, for each coil pair, an A.C. output signal having a predetermined cyclic amplitude function as its amplitude coefficient in the following manner:

$$Vs - Vsa = (Po + P\sin\theta)\sin\omega t - (Po - P\sin\theta)\sin\omega t$$
$$= 2\sin\theta\sin\omega t$$
$$Vc - Vca = (Po + P\cos\theta)\sin\omega t - (Po - P\cos\theta)\sin\omega t$$
$$= 2\cos\theta\sin\omega t$$

Thus, there can be generated two A.C. output signals (sin θ sin ωt and cos θ sin ωt) having, as amplitude coefficients, two cyclic amplitude functions (sin θ and cos θ) corresponding to the rotational angle θ of the steering wheel H that is the object to be detected, in a similar manner to outputs from the conventional resolver.

Figure 6:
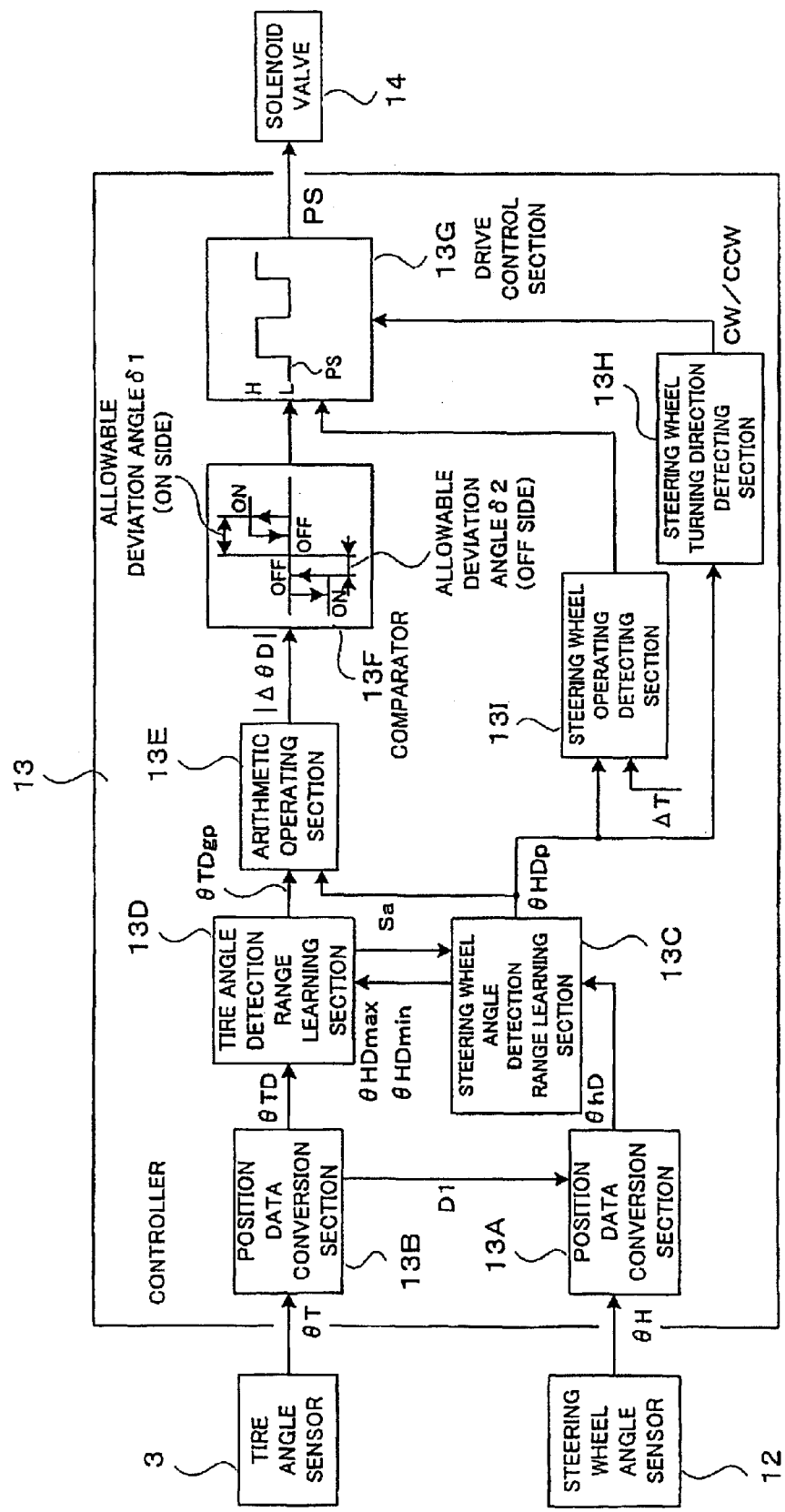
FIG. 6 is a functional block diagram showing an example of circuit construction of the controller shown in FIGS. 3 and 4.

FIG. 6 is a functional block diagram showing an example of a circuit construction of the controller 13. The controller 13 comprises the MPU, the memory including ROM and RAM, etc., as described earlier. In FIG. 6, however, illustration of such computer hardware is omitted, and only the processing executed by the computer software is indicated in the form of functional blocks. Part of the function of the position data conversion section 13A is realized with a special hardware circuit, while the remaining parts are realized with processing by the computer software.

The position data conversion section 13A detects, as an absolute value, the rotating position of the steering wheel shaft Hs in the rotating angle range (0° to 360°) per rotation of the steering wheel H, by measuring the amplitude function sin θ and the phase component θ in the A.C. output signals sin θ sin ωt and cos θ sin ωt of sine and cosine functional characteristics output from the steering wheel angle detector 12M. Then, a steering wheel detection signal corresponding to the rotational position of the steering wheel shaft Hs, i.e. the steering wheel H, is output to the position data conversion section 13A. The position data conversion section 13A may be implemented such as by using a technique disclosed in the Japanese Laid-open Patent Publication No. 9-126809 (corresponding to U.S. Pat. No. 5,710,509), for example. For example, an A.C. signal sin θ cos ωt is generated by electrically shifting the first AC output signal sin θ sin ωt by 90°, and two A.C. signals sin(ωt+θ) and sin(ωt–θ) phase-shifted in a phase-advancing or phase-delaying direction in accordance with θ (i.e., signals having their phase components θ converted into A.C. phase shifts) are generated by additively and subtractively synthesizing this A.C. signal $\sin θ \cos ωt$ with the second AC output signal $\cos θ \sin ωt$, in such a manner that rotational position detection data of the steering wheel H, namely steering wheel angle detection data θhD, can be obtained by measuring the phase θ. In an alternative, a conventionally-known R-D converter normally used for processing a resolver output may be used as this position data conversion section 13A.

The position data conversion section 13B converts the analogue tire angle detection signal θT input from the tire angle sensor 3 into digital data, and outputs digital tire angle detection signal θTD. It also outputs data on the number of times of rotation of steering wheel angle D1 corresponding to the number of times of rotation of the steering wheel, based on that tire angle detection signal θTD.

The controller 13 shown in FIG. 6 is characterized in that it is realized in a way to detect, when performing ON-OFF control of the solenoid valve 14, the rotating range of the steering wheel and the steering range of the steered wheels, with a steering wheel angle detection range learning section 13C and tire angle detection range learning section 13D, so as to cope properly with any type of vehicle. Namely, in industrial vehicles such as a fork lift truck, etc., while the rotating range of the steering wheel and the steering range of the steered wheels vary depending on the vehicle type, as mentioned earlier, the controller 13 in this embodiment can cope properly with any type of vehicle, by constantly detecting, through learning, the rotating range of the steering wheel and the steering range of the steered wheels of the vehicles forming the subject of the application.

Figure 7A:
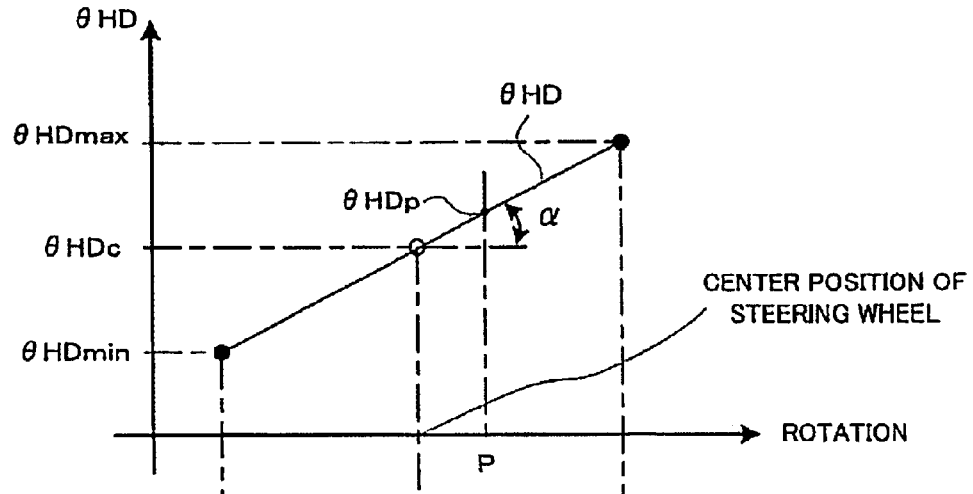
FIG. 7A is a graph illustrating an example of steering wheel angle detection data obtained by the steering wheel angle detection range learning section.
Figure 8A:
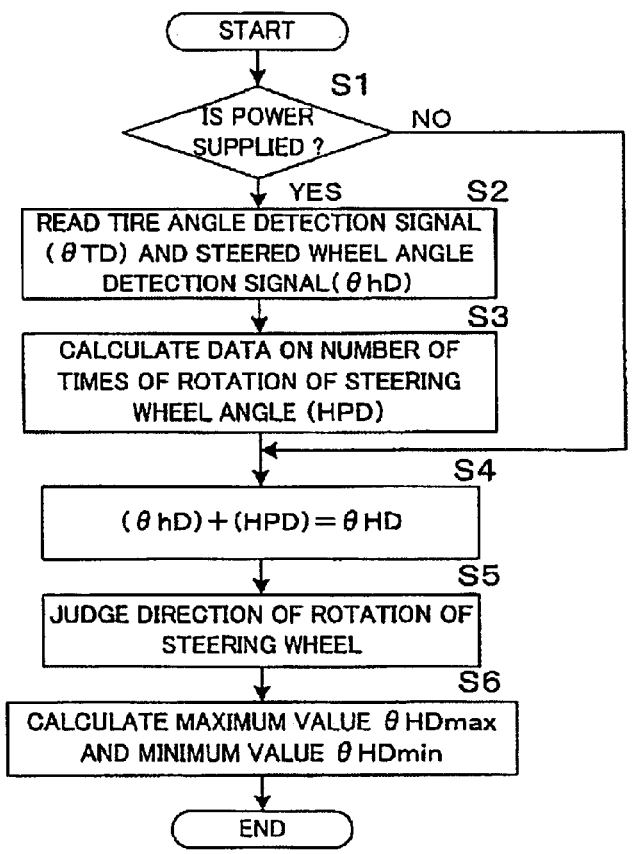
FIG. 8A is a flow chart showing an example of processing for learning executed by said steering wheel angle detection range learning section.

The steering wheel angle detection range learning section 13C detects the rotating range of the steering wheel through learning, based on steering wheel angle detection data θHD output by the position data conversion section 13A. FIG. 7A is a schematic diagram showing an example of processing for learning of the steering wheel angle detection signal θHD, obtained by the steering wheel angle detection range learning section 13C. FIG. 8A is a flow chart showing an example of processing for learning of the rotating range of steering wheel executed by said steering wheel angle detection range learning section 13C.

In FIG. 8A, when the power source of the vehicle is turned on, in step S1, the position data conversion section 13B presets the data on the number of times of rotation of steering wheel angle D1 corresponding to the current tire angle detection signal θTD, by outputting it on the position data conversion section 13A. This makes it possible to output steering wheel angle detection data θhD of the steering wheel rotating position corresponding to the current number of times of rotation of the steering wheel, from the position data conversion section 13A to the steering wheel angle detection range learning section 13C.

In step S2, the output steering wheel angle detection data θhD is read from the position data conversion section 13A and the current tire angle detection signal θTD is read from the position data conversion section 13B, respectively.

In step S3, data on the number of times of rotation of steering wheel angle (HPD) corresponding to the tire angle detection signal θTD is calculated. For example, output steering wheel angle detection data θhD for a single rotation (360°) of steering wheel obtained depending on the tire angle detection signal θTD is counted, and that counted value is taken as data on the number of times of rotation of steering wheel angle.

In step S4, an operation of adding the output steering wheel angle detection data (θhD) and the data on the number of times of rotation of steering wheel angle (HPD) is performed, to thereby obtain steering wheel angle detection signal θHD corresponding to the number of times of rotation of steering wheel.

In step S5, discrimination is made of the direction of rotation of the steering wheel. For example, the controller 13 compares, each time when it reads data, the data read this time with the previously read data and judges as right turn if the current data is "larger" than the previous data, and judges as left turn if the current data is "smaller".

In step S6, the peak value, i.e., maximum value θHDmax, and the minimum value θHDmin of the steering wheel angle detection signal θHD are determined. For example, the controller 13 compares, each time when it fetches data θHD corresponding to a right turn of the steering wheel, the data read this time with the previously read data and memorizes the larger data, and renews the data, so as to keep the value of the data memorized in the last place as maximum value θHDmax (see FIG. 7A). Furthermore, the controller 13 compares, each time when it fetches steering wheel angle detection data θHD for left turn of the steering wheel, the data read this time with the previously read data and memorizes the smaller data, and renews the data, so as to keep the value of the data memorized in the last place as minimum value θHDmin (see FIG. 7A). In step S6, renewal of maximum value θHDmax and minimum value θHDmin is stopped, at the point in time when a renewal stop signal Sa is input from the tire angle detection range learning section 13D.

As described above, a processing to learn the rotating range of the steering wheel is performed, by detecting the maximum value θHDmax and the minimum value θHDmin of the steering wheel angle detection data θHD with the steering wheel angle detection range learning section 13C. This learning may be repeated as required.

Figure 7B:
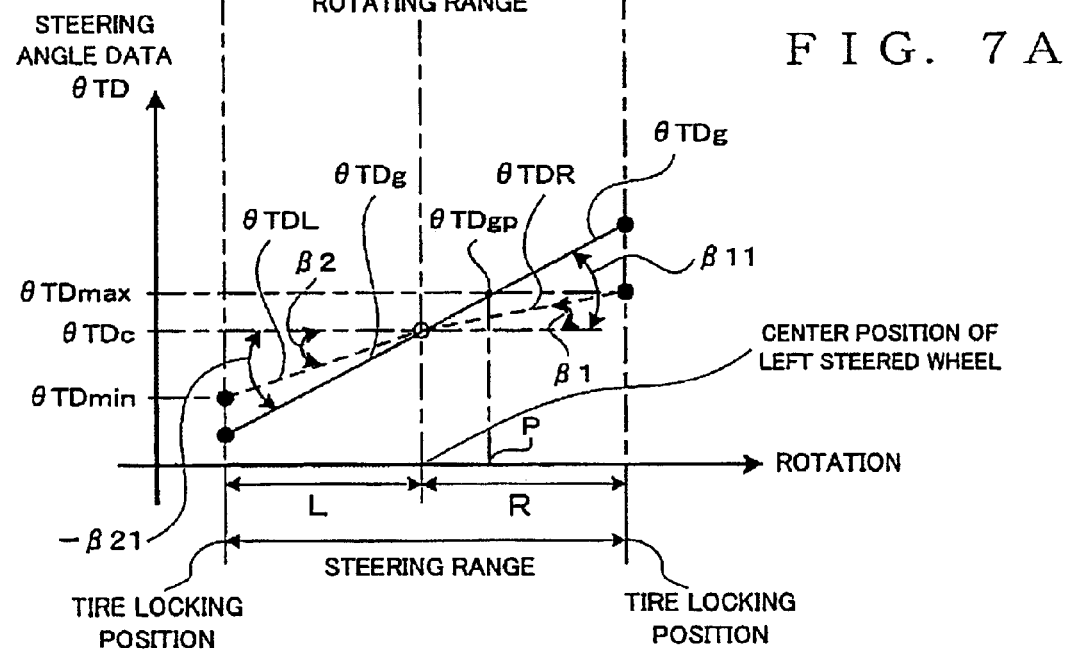
FIG. 7B is a graph illustrating an example of tire angle detection data obtained by the tire angle detection range learning section and gain modified tire angle data obtained by adjusting the gain of that tire angle detection data.
Figure 8B:
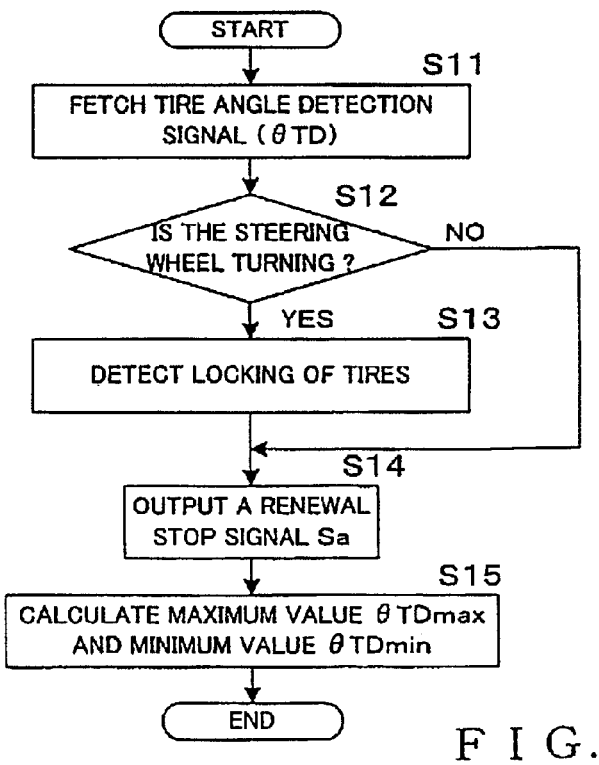
FIG. 8B is a flow chart showing an example of processing for learning executed by the tire angle detection range learning section.

The tire angle detection range learning section 13D detects, through learning, the steering range of the steered wheels based on the tire angle detection signal θTD output from the position data conversion section 13B. FIG. 7B is a schematic diagram showing an example of tire angle detection data θTD of steered wheels obtained by the tire angle detection range learning section 13D and of gain modified tire angle data θTDg obtained by adjusting the gain (inclination) of that detection data θTD. FIG. 8B is a flow chart showing an example of processing for learning of the steering range executed by said detection range learning section 13D.

In FIG. 8B, the position data conversion section 13B reads tire angle detection data θTD, in step S11.

In step S12, it is determined whether the steering wheel is turning or not. For example, it is determined that the steering wheel is turning, if the data which is read this time is different from the previously read data. The reason why such determination should be performed is that it is necessary to recognize, on a fork lift truck, the steering wheel of which can be turned any number of times, the rotating state of the steering wheel, as a precondition for detecting the tire locking position of steered wheels T1, T2, i.e. the position where the steered wheels can no longer be steered, even if the steering wheel is turned.

In step S13, the tire locking position is detected. For example, the system recognizes the tire locking position as such, in the case when the tire position detection data read this time is not changed from the previously read tire position defection data, in spite of the fact that steering wheel angle detection data (θhD) has been read through the position data conversion section 13A and that the steering wheel angle detection data fetched this time is changed from the previously fetched steering wheel angle detection data.

In step S14, a renewal stop signal Sa is output on the steering wheel angle detection range learning section 13C.

In step S15, the peak value, i.e. maximum value, and the minimum value of the tire angle detection signal θTD are detected. For example, the controller 13 compares, each time when it reads right tire angle detection data θTDR corresponding to a right turn of the steering wheel, the data read this time with the previously read data and memorizes the larger data, and renews the data, so as to obtain the value of the data memorized in the last place as maximum value θTDmax (see FIG. 7B). Furthermore, the controller 13 compares, each time when it fetches left tire angle detection data θTDL corresponding to the rotating position for left turn of the steering wheel, the data fetched this time with the previously fetched data and memorizes the smaller, data, and renews the data, so as to obtain the value of the data memorized in the last place as minimum value θTDmin (see FIG. 7B). In that case, it will be better to put a tire angle detection data θHDc corresponding to the center position of the left steered wheel when the left and right steered wheels are directed in the straight moving direction as "0", for example, and determine the maximum value θTDmax and the minimum value θTDmin with reference to that data.

As described above, a processing to learn the rotating range of the steered wheels is performed, by detecting the maximum value θTDmax and the minimum value θTDmin of the tire angle detection data θTD with the steering wheel angle detection range learning section 13C. This learning may be repeated as required.

Generally, on a vehicle provided with two steered wheels T1 and T2, like the vehicle of the subject embodiment, the respective steered wheels T1, T2 indicate different tire angles for each relative to the amount of rotation of the steering wheel depending on whether the steering wheel is turned to the right R or to the left L from the center position of the steering wheel. For that reason, the tire angle detection data for right steering direction R (hereinafter referred to as right tire angle detection data) θTDR and the tire angle detection data for left steering direction L (hereinafter referred to as left tire angle detection data) θTDL are different in the gain (weight of data: inclination of data in the illustrated example) against the tire angle detection data θTDc at the center position of the left steering wheel, as shown in FIG. 7B. Namely, the gain (β1) of the right tire angle detection data θTDR is smaller than the gain (−β2) of the left tire angle detection data θTDL. This difference in gain means that, in the left steered wheel, the tire angle in the right steering direction R is smaller than the tire angle in the left steering direction L.

Moreover, to correct deviation in the relation of correspondence between the steering wheel angle and the tire angle of the steered wheels corresponding to the turning operation of the steering wheel, it is necessary to equalize the gain of the steering wheel angle detection data θHD, the gain of the right tire angle detection data θTDR and the left tire angle detection data θTDL with one another. In that case, if one adjusts the gain of the right tire angle detection data θTDR with reference to the maximum value θTDmax of the data concerned and adjusts the gain of the left tire angle detection data θTDL with reference to the minimum value θqTDmin of the data concerned, the tire angle detection data θTDc corresponding to the center position of the left steered wheel shifts, and that is undesirable. For that reason, in this embodiment, the position data conversion section 13B performs gain adjustment of the right tire angle detection data θTDR and the left tire angle detection data θTDL separately from each other, with reference to the tire angle detection data θTDc corresponding to said center position.

FIG. 9 is a flow chart showing an example of gain adjustment executed by the tire angle detection range learning section 13D.

In FIG. 9, the steering wheel angle detection range learning section 13C fetches the maximum value θHDmax and the minimum value θHDmin of the steering wheel angle detection signal θHD, in step S21.

In step S22, the gain α of the steering wheel angle detection signal θHD is calculated, and the weighting coefficients K1, K2 for weighting the right and left tire angle detection data θTDR, θTDL respectively are determined as equal to the calculated gain α. For example, the gain α is determined, as shown in FIG. 7A, from the difference (θHDmax−θHDc) between the maximum value θHDmax of the steering wheel angle detection data θHD and the center position data θHDc corresponding to the center position of the steering wheel (steering wheel position observed when the left and right steered wheels are directed to the straight moving direction). To the contrary, the gain α may be determined from the difference (θHDmin−θHDc) between the minimum value θHDmin of the steering wheel angle detection data θHD and the center position data θHDc. The weighting coefficient K1 is determined by dividing the gain α by the maximum value θTDmax of the right tire angle detection data θTDR as shown in FIG. 7B (α/θTDmax). Furthermore, the weighting coefficient K2 is determined by dividing the gain α by the minimum value θTDmin of the left tire angle detection data θTDL as shown in FIG. 7B (α/θHDmin).

In step S23, gain modified tire angle data θTDg is generated, by adjusting the gain β1 of the right tire angle detection data θTDR and the gain β2 of the left tire angle detection data θTDL. Namely, as shown in FIG. 7B, the right tire angle detection data θTDR is multiplied by the weighting coefficient K1 (namely, K1×θTDR), and the left tire angle detection data θTDL is multiplied by the weighting coefficient K2 (namely, K2×θTDL). As a result, the gain β1 of the right tire angle detection data θTDR is adjusted to a gain (β11), the same as the gain α of the steering wheel angle detection data θHD, and the gain β2 of the left tire angle detection data θTDL is adjusted to a gain (−β21), the same as the gain α. This makes it possible to generate gain modified tire angle data θTDG having gains β11, −β21 corresponding to the gain α of the steering wheel angle detection data θHD.

The above described gain adjustment may be renewed at each time of learning of the rotating range of the steering wheel and learning of the steering range of the steered wheels.

In the above mentioned gain adjustment, the gain of the steering wheel angle detection data θHD may be adjusted in a way to fit the gain of the tire angle detection data θTDR and θTDL. Furthermore, to make the gain of the tire angle detection data θTDR and θTDL fit the gain of the steering wheel angle detection data θHD, it may be all right to adjust the gain of the tire angle detection data θTDR and θTDL and the gain of the steering wheel angle detection data θHD.

Figure 10:
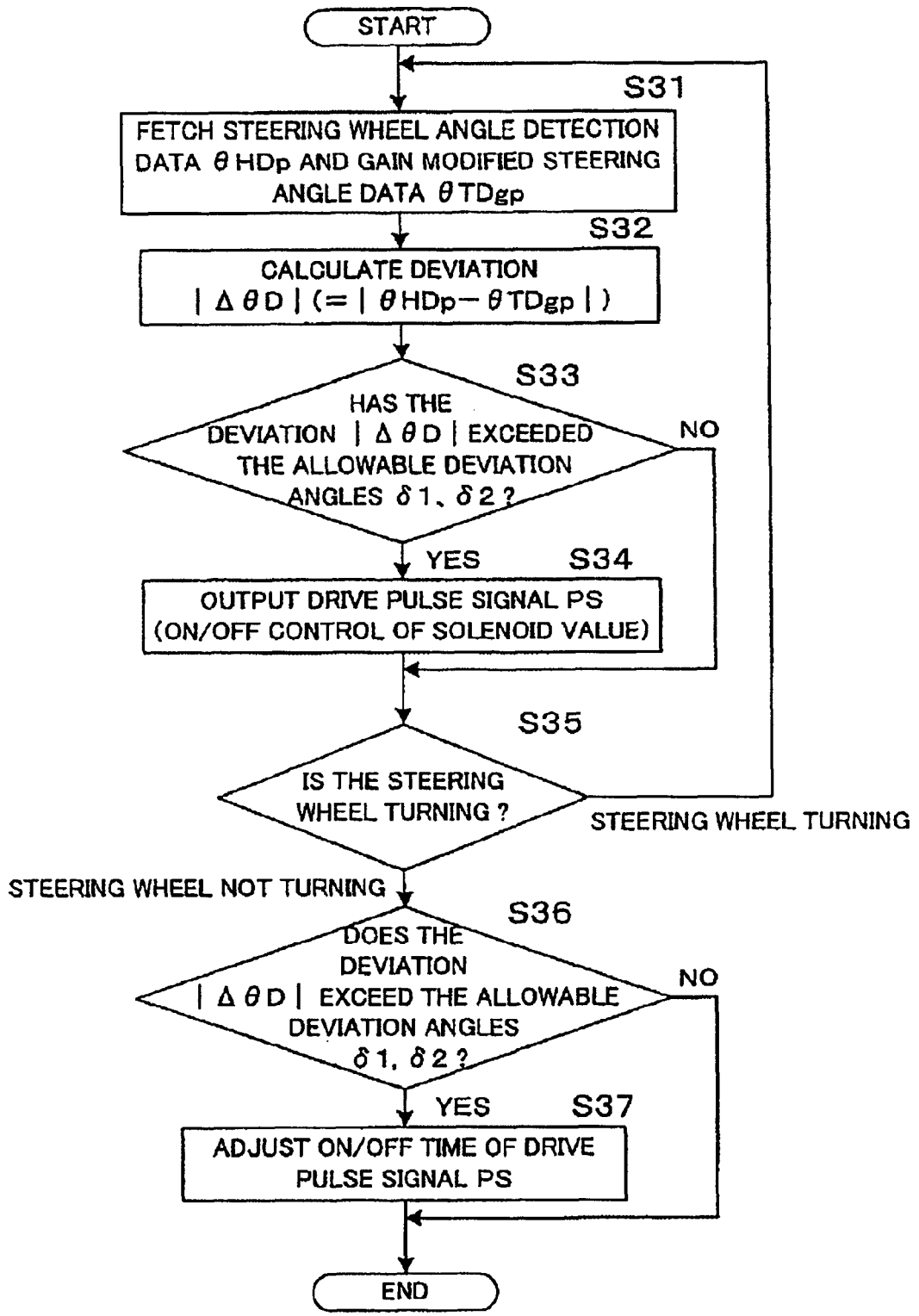
FIG. 10 is a flow chart showing an example of processing for steering wheel angle adjustment executed by the drive control section.

Next, explanation will be made regarding the correction of deviation in the steering wheel angle executed by the drive control section 13G of the controller 13, with reference to FIGS. 6, 7A, 7B and 10. FIG. 10 is a flow chart showing an example of correction of deviation in the steering wheel angle. The correction of deviation in the steering wheel angle performed by this embodiment is common to the case where the steering wheel is turned in the left turning direction and the case where the steering wheel is turned in the right turning direction. The correction of deviation in the steering wheel angle in the case where the steering wheel is turned in the right turning direction will be explained here.

In FIG. 10, the controller 13 fetches, in step S31, a steering wheel angle detection data θHDp corresponding to the rotating position P of the steering wheel (see FIG. 7A) at the time when the steering wheel is turned in the right turning direction, at the arithmetic operating section 13E. Moreover, the controller 13 also fetches, at the arithmetic operating section 13E, gain modified tire angle data θTDgp of the steered wheels corresponding to said steering wheel turning position P.

In step S32, the controller 13 calculates, at the arithmetic operating section 13E, the deviation |ΔθD|(=|θHDp−θTDgp|) between the steering wheel angle detection data θHDp and the gain modified tire angle data θTDgp. In that case, the deviation becomes (+ΔθD) when said data θHDp is larger than the data θTDgp (θHDp>θTDgp), and the deviation becomes (−ΔθD) when said data θHDp is smaller than the data θTDgp (θHDP<θTDgp).

In step S33, the controller 13 judges, by means of the comparator 13F, if the deviation ΔθD exceeded the allowable deviation angles δ1, δ2 or not. Namely, the controller judges, when the deviation is (+ΔθD), if that deviation exceeds the allowable deviation angle δ1 for solenoid valve ON (ON side with the example in the figure) or not. Furthermore, the controller 13 judges, when the deviation is (−ΔθD), if that deviation exceeds the allowable deviation angle δ2 for solenoid valve OFF (OFF side with the example in the figure) or not. If the deviation "+ΔθD" exceeds the allowable deviation angle δ1 or the deviation "−ΔθD" exceeds the allowable deviation angle δ2, the processing goes to step S34.

In step S34, the controller 13 generates, by means of the drive control section 13G, a drive pulse signal PS, and outputs the generated drive pulse signal PS to the solenoid valve 14. In this case, even if either the deviation "+ΔθD" exceeding the allowable deviation angle δ1 or the deviation "−ΔθD" exceeding the allowable deviation angle δ2 are the same in both the right turning direction CW and the left turning direction CCW, the amount of correction of deviation for keeping the respective deviations within the predetermined allowable deviation angles varies with the right turning direction CW and the left turning direction CCW. For that reason, in this embodiment, it is so designed as to detect the steering wheel turning direction (CW or CCW), on the basis of the steering wheel angle detection data θHDp obtained by the steering wheel angle detection range learning section 13C, by means of the steering wheel turning direction detecting section 13H, and change output timing of the drive pulse signal PS depending on the detected steering wheel turning direction. As the solenoid 14A is ON-OFF controlled with the drive pulse signal PS, the solenoid valve 14 is driven and controlled in a way to alternately repeat the action of releasing the auxiliary feed pipe P3 at ON (see FIG. 3) and closing the auxiliary feed pipe P3 at OFF (see FIG. 4). The SCU 11 feeds an oil volume Q1+Q2 to the hydraulic cylinder 2 when the solenoid valve 14 is ON, and feeds an oil volume Q1 to the hydraulic cylinder 2 when the solenoid valve 14 is OFF. This enables to correct deviation in the relation of correspondence between the steering wheel angle and the tire angle of the steered wheels, produced in a case of slow rotating speed of the steering wheel H or a case of leakage of hydraulic operating fluid from the SCU 11, etc.

In step S35, presence or absence of any steering wheel turning operation is judged at the steering wheel operation detecting section 131. For example, the controller 13 fetches, from the steering wheel angle detection range learning section 13C, steering wheel angle detection data θHDp corresponding to the steering wheel rotating position P one after another, then calculates the steering wheel rotating speed by determining the difference between the data fetched this time and the previously fetched data and making differential operation with prescribed time constant ΔT, and judges that there is no turning operation of the steering wheel i.e. the turning operation of the steering wheel stopped when the rotating speed of the steering wheel is "0", and passes to step S37. However, in the case where the rotating speed of the steering wheel is not "0", the controller 13 judges that there is a turning operation of the steering wheel and returns to step S31, to execute the routine from step S31 to step S34.

In step S36, it is determined, by means of the drive control section 13G, whether the deviation |ΔθD| at the time without any turning operation of the steering wheel exceeds the allowable deviation angles δ1, δ2 or not. If the deviation |Δ↓D| exceeds the allowable deviation angles δ1, δ2, the processing goes to step 37.

In step S37, ON-OFF time of the drive pulse signal PS is adjusted by means of the drive control section 13G. Namely, an adjustment is made in a way to increase the ON time of the drive pulse signal PS (see part (A) of FIG. 11) in the case where the deviation "+ΔθD" exceeds the allowable deviation angles δ1, and in a way to increase the OFF time of the drive pulse signal PS (see part (B) of FIG. 11) in the case where the deviation "−ΔθD" exceeds the allowable deviation angles δ2. In this case also, in the same way as in said step S34, the steering wheel turning direction (CW or CCW) is detected, on the basis of the steering wheel angle detection data θHDp obtained by the steering wheel angle detection range learning section 13C, by means of the steering wheel turning direction detecting section 13H, and the output timing of the drive pulse signal PS is changed in correspondence with the detected steering wheel turning direction. By making an adjustment in a way to increase the ON time of the drive pulse signal PS, it becomes possible to increase the modified oil volume to be supplied to the cylinder 2, when a steering wheel turning operation is started, so as to make a proper correction of deviation in steering wheel angle suitable to the deviation concerned. Still more, by making an adjustment in a way to increase the OFF time of the drive pulse signal PS, it becomes possible to decrease the modified oil volume to be supplied to the cylinder 2, when a steering wheel turning operation is started, so as to make a proper correction of deviation in steering wheel angle suitable to the deviation concerned. The above-mentioned ON-OFF time to be adjusted may be determined by either using an optional deviation-ON/OFF time conversion table or making an optional processing operation, for example.

In this embodiment, the tire angle of the left steered wheel T1 is detected with the tire angle sensor 3, but it is also acceptable to detect the piston position of the hydraulic cylinder 2 by using the cylinder position detecting device, etc. as indicated in the Japanese Laid-open Patent Publication No. 11-132205 applied for by the applicant of the present invention, and use that detected value considering it as tire angle of the steered wheel. Moreover, as steering wheel angle sensor 12, one may use a steering wheel angle sensor with multiple turns capable of linearly detecting steering wheel angle in response to the number of turns of the steering wheel H. In that case, the learning operation of the steering wheel turning range can be simplified, because there is no longer any need of presetting the number of times of rotation of the steering wheel at the time of closing of power and no need for calculation of the number of times of rotation of the steering wheel at the steering wheel angle detection range learning section 13C.

As explained so far, the control unit for power steering apparatus according to the present invention, in which the main hydraulic operating fluid feed device, the steering wheel angle sensor and the control circuit device can be handled as a single unit, provides an excellent effect of improving operability.

The steering wheel angle correcting system according to the present invention provides excellent effects of being applicable to vehicles with different steering wheel rotating ranges or steering ranges of steered wheels and capable of correcting deviation in the relation of correspondence between the steering wheel angle and the tire angle of the steered wheels corresponding to the rotational position of the steering wheel.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A control unit for use with a power steering apparatus including a hydraulic cylinder for controlling steerage of steered wheels in response to rotation of a steering wheel and a tire angle sensor for detecting the tire angle of said steered wheels, said control unit comprising:
   a main operating-oil supply device, removably connected to a rotation shaft of the steering wheel, for supplying the hydraulic cylinder with an amount of oil corresponding to a rotated amount of the steering wheel;
   a correcting-oil supply device for, in response to a control signal, supplying correcting oil to correct operation of the hydraulic cylinder;
   a steering-wheel-angle detector, disposed around the rotation shaft of the steering wheel connected with said main operating-oil supply device, for detecting a steering wheel angle corresponding to a rotating position of the steering wheel; and
   a control circuit device for generating, on the basis of the steering wheel angle detected by said steering-wheel-angle detector and the tire angle detected by the tire angle sensor, a control signal to compensate for a discrepancy in corresponding relationship between the steering wheel angle and the tire angles, and controlling the supply, by said correcting-oil supply device, of the correcting oil,
   wherein said steering-wheel-angle detector and said control circuit device are attached to a housing of said main operating-oil supply device so that said steering-wheel-angle detector and said control circuit device are provided as a one-piece unit with said main operating-oil supply device.

2. A control unit for use with a power steering apparatus as defined in claim 1, wherein said steering-wheel-angle detector is disposed around a steering wheel insertion hole for mounting the rotating shaft of the steering wheel in said main operating-oil supply device, and said control circuit device is disposed close to said steering-wheel-angle detector.

3. A control unit for use with a power steering apparatus as defined in claim 2, wherein a circuit board of said control circuit device extends to a point corresponding to the disposition of said steering-wheel-angle detector, the steering-wheel-angle detector is disposed on the circuit board of said control circuit device, and the steering-wheel-angle detector and the control circuit device are integrated with each other.

4. A control unit for use with a power steering apparatus as defined in claim 1, wherein said control circuit device comprises:
   a first section that learns an entire steered range of the steered wheels on the basis of a tire angle detection signal indicative of a tire angle of the steered wheels;
   a second section that learns a rotational range of the steering wheel corresponding to the entire steered range of the steered wheels, on the basis of a steering-wheel-angle detection signal corresponding to a rotating position of the steered wheel;
   a third section that, on the basis of the learned entire steered range of the steered wheels and the learned rotational range of the steering wheel corresponding to the entire steered range of the steered wheels, determines first modifying data concerning a rightward steering direction of the steered wheels and second modifying data concerning a leftward steering direction of the steered wheels; and
   a fourth section that modifies at least one of a current tire angle detection signal and current steering-wheel-angle detection signal in accordance with the first or second modifying data corresponding to a current steering direction of the steered wheels, so as to generate said control signal in accordance with a deviation between the tire angle detection signal and the steering-wheel-angle detection signal.

5. A steering-wheel-angle correcting system for use with a power steering apparatus including a hydraulic device for controlling steerage of steered wheels in response to rotation of a steering wheel, said steering-wheel-angle correcting system comprising:
   a first section that learns an entire steered range of the steered wheels on the basis of a tire angle detection signal indicative of a tire angle of the steered wheels;
   a second section that learns a rotational range of the steering wheel corresponding to the entire steered range of the steered wheels, on the basis of a steering-wheel-angle detection signal corresponding to a rotating position of the steered wheel;
   a third section that, on the basis of the learned entire steered range of the steered wheels and the learned rotational range of the steering wheel corresponding to the entire steered range of the steered wheels, determines first modifying data concerning a rightward steering direction of the steered wheels and second modifying data concerning a leftward steering direction of the steered wheels; and
   a fourth section that modifies at least one of a current tire angle detection signal and current steering-wheel-angle detection signal in accordance with the first or second modifying data corresponding to a current steering direction of the steered wheels, so as to correct the steerage of the steered wheels in accordance with a deviation between the tire angle detection signal and the steering-wheel-angle detection signal.

6. A steering-wheel-angle correcting system as defined in claim 5, further comprising a fifth section that performs of either increasing or decreasing, through learning, the amount of adjustment of steerage of said steered wheels in accordance with said deviation.

* * * * *